(12) United States Patent
Brunneke

(10) Patent No.: US 10,280,971 B2
(45) Date of Patent: May 7, 2019

(54) JOINT DEVICE FOR A MOTOR VEHICLE

(71) Applicant: ZF Friedrichshafen AG, Friedrichshafen (DE)

(72) Inventor: Hans-Gerd Brunneke, Georgsmarienhütte (DE)

(73) Assignee: ZF FRIEDRICHSHAFEN, Friedrichshafen (DE)

( * ) Notice: Subject to any disclaimer, the term of this patent is extended or adjusted under 35 U.S.C. 154(b) by 391 days.

(21) Appl. No.: 14/652,824

(22) PCT Filed: Nov. 18, 2013

(86) PCT No.: PCT/EP2013/074004
§ 371 (c)(1),
(2) Date: Jun. 17, 2015

(87) PCT Pub. No.: WO2014/095189
PCT Pub. Date: Jun. 26, 2014

(65) Prior Publication Data
US 2015/0322999 A1 Nov. 12, 2015

(30) Foreign Application Priority Data
Dec. 19, 2012 (DE) .................. 10 2012 223 790

(51) Int. Cl.
*F16C 11/06* (2006.01)
*B60G 7/00* (2006.01)
(52) U.S. Cl.
CPC .......... *F16C 11/0666* (2013.01); *B60G 7/005* (2013.01); *F16C 11/06* (2013.01);
(Continued)

(58) Field of Classification Search
CPC ... F16C 11/0666; F16C 11/0671; F16C 11/06; F16C 11/0614; F16C 2326/05;
(Continued)

(56) References Cited

U.S. PATENT DOCUMENTS 2,544,541 A * 3/1951 McCarthy ................ F16J 15/52
180/90.6
3,128,104 A * 4/1964 Teske ...................... F16J 15/36
277/348
(Continued)

FOREIGN PATENT DOCUMENTS

DE 41 12 791 C1 7/1992
JP H01-73520 U 5/1989
(Continued)

OTHER PUBLICATIONS

German Office Action Corresponding to 10 2012 223 790.9 dated Aug. 13, 2014.
(Continued)

*Primary Examiner* — Matthew R McMahon
(74) *Attorney, Agent, or Firm* — Davis & Bujold PLLC; Michael J. Bujold

(57) ABSTRACT

A joint device (6) having an axially extending joint pin (8) and a housing (11) that radially surrounds the pin, either wholly or partially. The joint pin (8) and the housing (11) can move relative to one another at least by pivoting or rotating, and a gap (13) between the two components is closed by a sealing device (14) which is effective in any position of the components (8; 11) relative to one another. The sealing device is designed in such manner that the sealing device (14), radially on the outside thereof, is in contact with and is supported by an inner wall area (15) of the housing (11).

18 Claims, 7 Drawing Sheets

(52) U.S. Cl.
CPC ......... *F16C 11/0671* (2013.01); *Y10T 403/31* (2015.01); *Y10T 403/32631* (2015.01); *Y10T 403/32729* (2015.01)

(58) Field of Classification Search
CPC .............. B60G 7/005; B60G 2204/416; Y10T 403/32631; Y10T 403/31; Y10T 403/32729; F16J 15/36
USPC .................................................. 277/389, 635
See application file for complete search history.

(56) References Cited

U.S. PATENT DOCUMENTS

| | | | | | |
|---|---|---|---|---|---|
| 3,449,029 | A | * | 6/1969 | Smith ................. | F16C 33/7836 384/482 |
| 3,814,446 | A | * | 6/1974 | Derman .............. | F16C 33/7886 277/366 |
| 3,873,166 | A | * | 3/1975 | Berg ................... | F16C 11/0614 277/507 |
| 3,947,077 | A | * | 3/1976 | Berg ................... | F16C 11/0614 277/361 |
| 4,034,996 | A | * | 7/1977 | Manita ................ | B60G 5/053 280/80.1 |
| 4,210,405 | A | * | 7/1980 | Jesswein ............. | F16C 11/045 277/500 |
| 4,309,063 | A | * | 1/1982 | Weis ................... | F16J 15/3224 277/399 |
| 4,373,739 | A | * | 2/1983 | Klem .................. | B60G 9/02 180/9.5 |
| 4,385,673 | A | * | 5/1983 | Olt, Jr. ............... | B62D 55/0842 180/9.5 |
| 4,553,760 | A | * | 11/1985 | Reed ................... | F16C 11/0666 180/9.5 |
| 4,575,162 | A | * | 3/1986 | Smith ................. | F16C 11/0614 384/2 |
| 4,880,329 | A | * | 11/1989 | Sakai .................. | B60G 7/005 29/898.05 |
| 5,058,829 | A | * | 10/1991 | Bentley .............. | B64D 11/0696 244/118.6 |
| 5,066,159 | A | * | 11/1991 | Urbach ............... | F16C 11/0666 277/635 |
| 5,085,444 | A | * | 2/1992 | Murakami ........... | B60G 7/00 277/503 |
| 5,460,678 | A | * | 10/1995 | Reinsma ............. | F16J 15/3208 156/242 |
| 5,573,336 | A | * | 11/1996 | Maroney ............. | F16C 33/74 277/507 |
| 5,601,378 | A | * | 2/1997 | Fukukawa .......... | F16C 11/0638 277/635 |
| 5,678,947 | A | * | 10/1997 | Urbach ............... | F16C 11/0633 277/507 |
| 5,931,597 | A | * | 8/1999 | Urbach ............... | B60G 7/005 403/122 |
| 6,530,711 | B2 | * | 3/2003 | Menotti .............. | F16C 11/0671 277/635 |
| 6,551,282 | B1 | * | 4/2003 | Exline ................ | A61B 17/3462 604/167.01 |
| 6,702,787 | B2 | * | 3/2004 | Racenet .............. | A61B 17/34 604/158 |
| 7,090,424 | B2 | * | 8/2006 | Barbosa .............. | F16C 11/0604 403/122 |
| 8,622,644 | B2 | * | 1/2014 | Becker ................ | F16C 11/045 403/134 |
| 8,647,010 | B2 | * | 2/2014 | Losche ................ | B60G 7/005 280/124.156 |
| 8,714,571 | B2 | * | 5/2014 | Nataraj ............... | B60G 7/001 280/124.107 |
| 8,783,702 | B2 | * | 7/2014 | Lee ..................... | B60G 7/02 280/124.134 |
| 2008/0181719 | A1 | * | 7/2008 | Gleason .............. | F16C 11/0614 403/76 |
| 2011/0293360 | A1 | * | 12/2011 | Becker ................ | F16C 11/045 403/161 |
| 2012/0070224 | A1 | * | 3/2012 | Losche ................ | B60G 7/005 403/227 |

FOREIGN PATENT DOCUMENTS

| | | | | |
|---|---|---|---|---|
| JP | 08159147 A | * | 6/1996 | .......... F16C 11/0638 |
| WO | WO-2004083660 A1 | * | 9/2004 | .......... F16C 11/0628 |
| WO | 2008/014509 A2 | | 1/2008 | |

OTHER PUBLICATIONS

International Search Report Corresponding to PCT/EP2013/074004 dated Jan. 27, 2014.
Written Opinion Corresponding to PCT/EP2013/074004 dated Jan. 27, 2014.
International Preliminary Examination Report Corresponding to PCT/EP2013/074004 dated Mar. 30, 2015.

\* cited by examiner

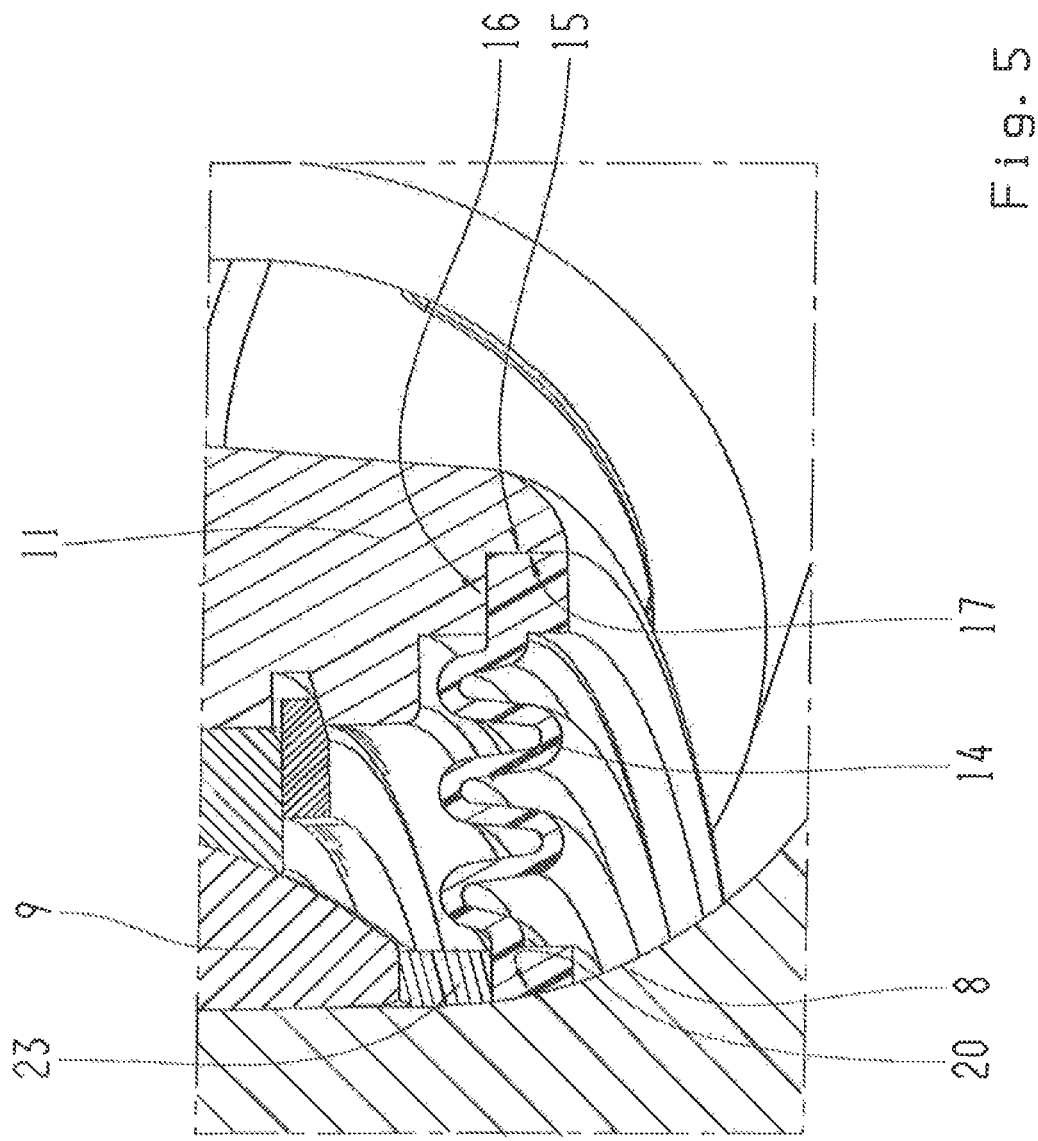

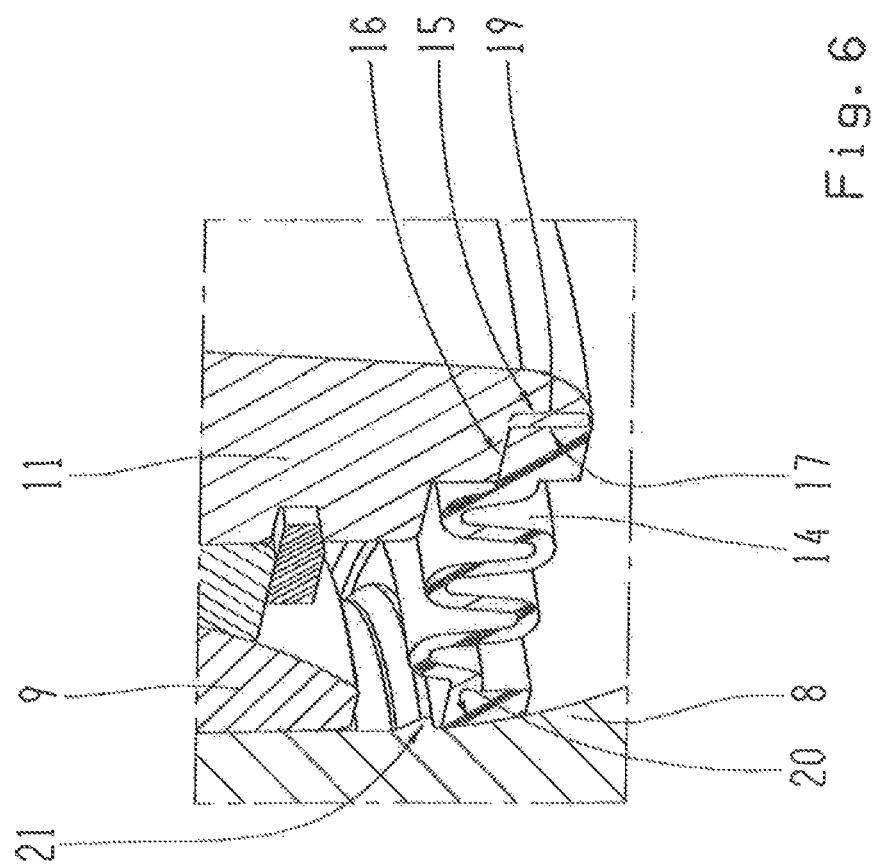

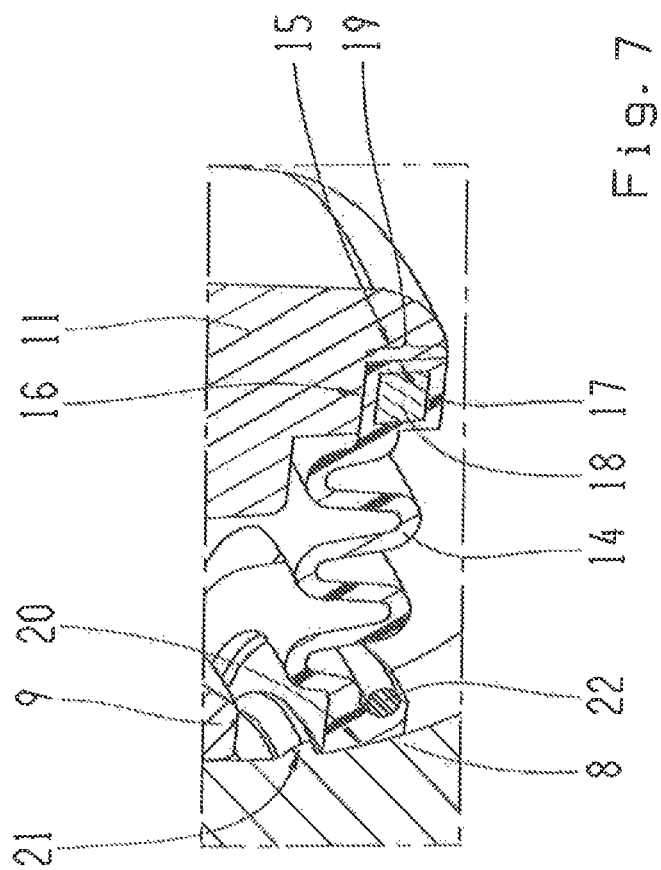

JOINT DEVICE FOR A MOTOR VEHICLE

This application is a National Stage completion of PCT/EP2013/074004 filed Nov. 18, 2013, which claims priority from German patent application serial no. 10 2012 223 790.9 filed Dec. 19, 2012.

FIELD OF THE INVENTION

The invention concerns a joint device, comprising at least one joint pin and at least one housing that surrounds it partially or completely, wherein the joint pin and the housing can move at least by pivoting relative to on another and a gap between these components is closed by a sealing device which is effective in any position of the components relative to one another.

BACKGROUND OF THE INVENTION

With joint devices of this type, which are for example in the form of ball joints, it is often necessary to provide a seal against dirt and water in order to prevent, effectively and lastingly, any interference with the mobility of the components relative to one another, possibly due to abrasion or flushing out of a lubricant. For that purpose known sealing devices are sleeves, which are perhaps pressed by a first clamping ring radially from the outside onto the housing and also pressed by a second clamping ring radially from the outside onto a neck area of the pin axially offset outward. Such sealing devices can therefore easily be located in the impact area of small stones, sand or the like, and owing to the speed of the vehicle can be impacted with high force by foreign bodies. There is even a risk of damage by high-pressure cleaners, which are often thoughtlessly also used for cleaning sensitive areas of that type. Furthermore the additional fixing elements entail further assembly effort and risk becoming loose over a time, or also sustaining damage from outside.

SUMMARY OF THE INVENTION

The present invention addresses the problem of achieving an improvement in these respects.

The invention solves the problem by a motor vehicle with the characteristics described below.

With the invention, in one embodiment the sealing device is in contact with and supported by an inner wall area of the housing, the housing does not need outwardly-projecting fixing elements for the sealing device. Thus, the massive and durable housing constitutes the radially outermost area of the fixing of the sealing device and can turn aside impacting stones, water and other outside influences, so that high, long-term stability is achieved. In addition there is no need to fit additional, external clamping rings or the like, so that manufacturing costs can be reduced. The sealing device is directly and immediately in contact. The cost of parts is therefore low. Moreover, only minimal fitting space is needed.

When, advantageously, the radially exterior edge area of the sealing device can be acted upon by an element that pre-stresses it outward, a high radial pre-stress can be produced to press the seal from inside against the housing.

In particular the outward pre-stressing element can be a clamping ring located inside or outside the seal material of the sealing device. It is also possible to vulcanize for example a metal ring in place.

To ensure a more secure hold for the sealing device onto the housing, it is advantageous to provide in that location a notch or radially inward extending groove.

In that case it is advantageous for the contact area of the sealing surface to extend at least 8 mm, so that slipping off of the seal is reliably avoided even over a long period.

In another embodiment the sealing device is held at least substantially in a protected position, screened by the housing from the outside, the housing screens the sealing device over at least almost its full length from radially outside and thus protects it from damage by particles or moisture impacting from outside—and likewise from UV radiation.

In particular, for that purpose the sealing device can extend from its contact with the housing, without any outward-projecting axial extension, within the projection of the contact surface. It is then best to position the sealing device, with its axial extension in relation to the pin, completely inside the contour of the housing.

For this, it is advantageous for the radially inner and radially outer edge areas to axially be at the same level.

Advantageously, the sealing device can also be secured in position at its radially inner edge area behind an edge formed in the pin, so that the sealing device cannot slip off the pin.

In particular, at that point and also at the radially exterior edge area of the seal, it is possible to secure the position of the seal on the housing with interlock.

To enable sufficient mobility of the joint device even without any appreciable axial extension of the sealing device, it can very advantageously be formed of a rubber-elastic material and can extend between its radially inner and radially outer edge areas along a meandering course with axially upward and axially downward sections.

A motor vehicle with at least one joint device according to the invention is also described below.

In particular, such a motor vehicle can be a utility vehicle (UV), wherein such a joint device serves inter aria to guide an axle of the motor vehicle by means of one or more links directly or indirectly connecting one or more chassis parts to the joint device. Typically, a direct link arrangement for supporting a rear axle can be formed according to the invention.

BRIEF DESCRIPTION OF THE DRAWINGS

Further advantages and features of the invention emerge from the example embodiments of the object of the invention illustrated in the drawing and described below.

The drawings show:

FIG. 5: A detailed section of the joint device approximately corresponding to the detail V in FIG. 4, but with the supporting ring separate, FIG. 6: A view similar to that of FIG. 5, but from a perspective seen more from above and with a holder formed integrally on the pin, under which the sealing device is clamped, FIG. 7: A view similar to that of FIG. 6, wherein however, in this case a first clamping ring acts from outside on the radially inner edge area and on the radially outer edge area a second clamping ring, vulcanized in place, is provided.

DETAILED DESCRIPTION OF THE PREFERRED EMBODIMENTS

Figure 1:
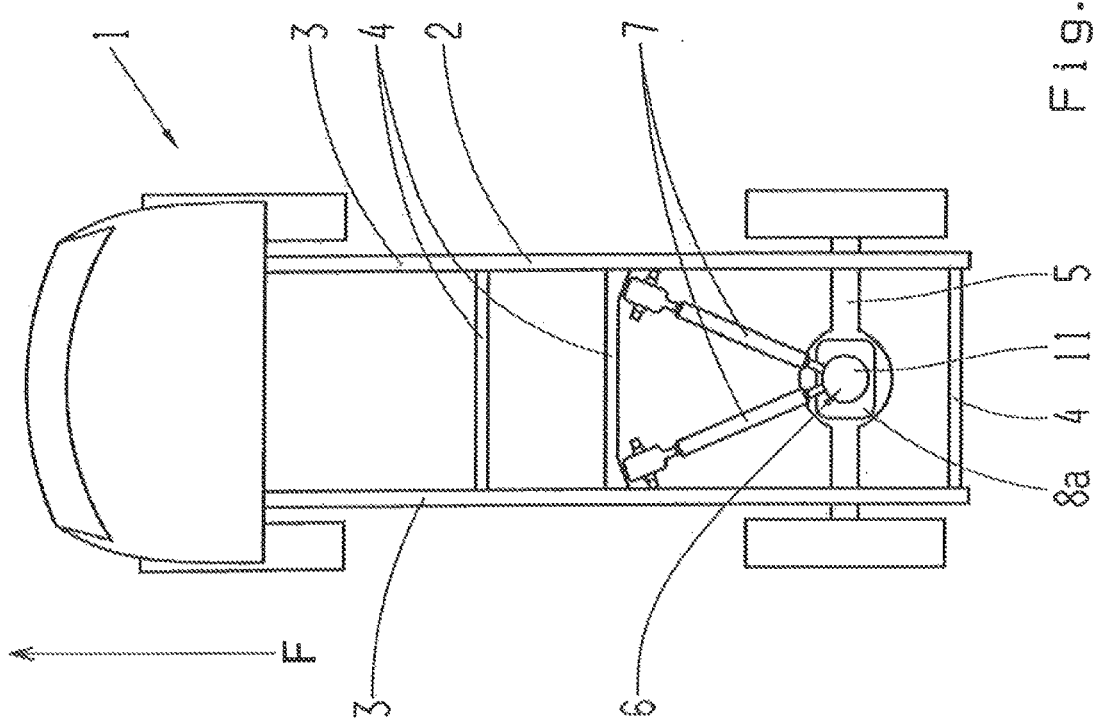
FIG. 1: A schematic plan view of a utility vehicle with, as an example, a joint device attached by means of two wishbones to a rear axle differential.
Figure 2:
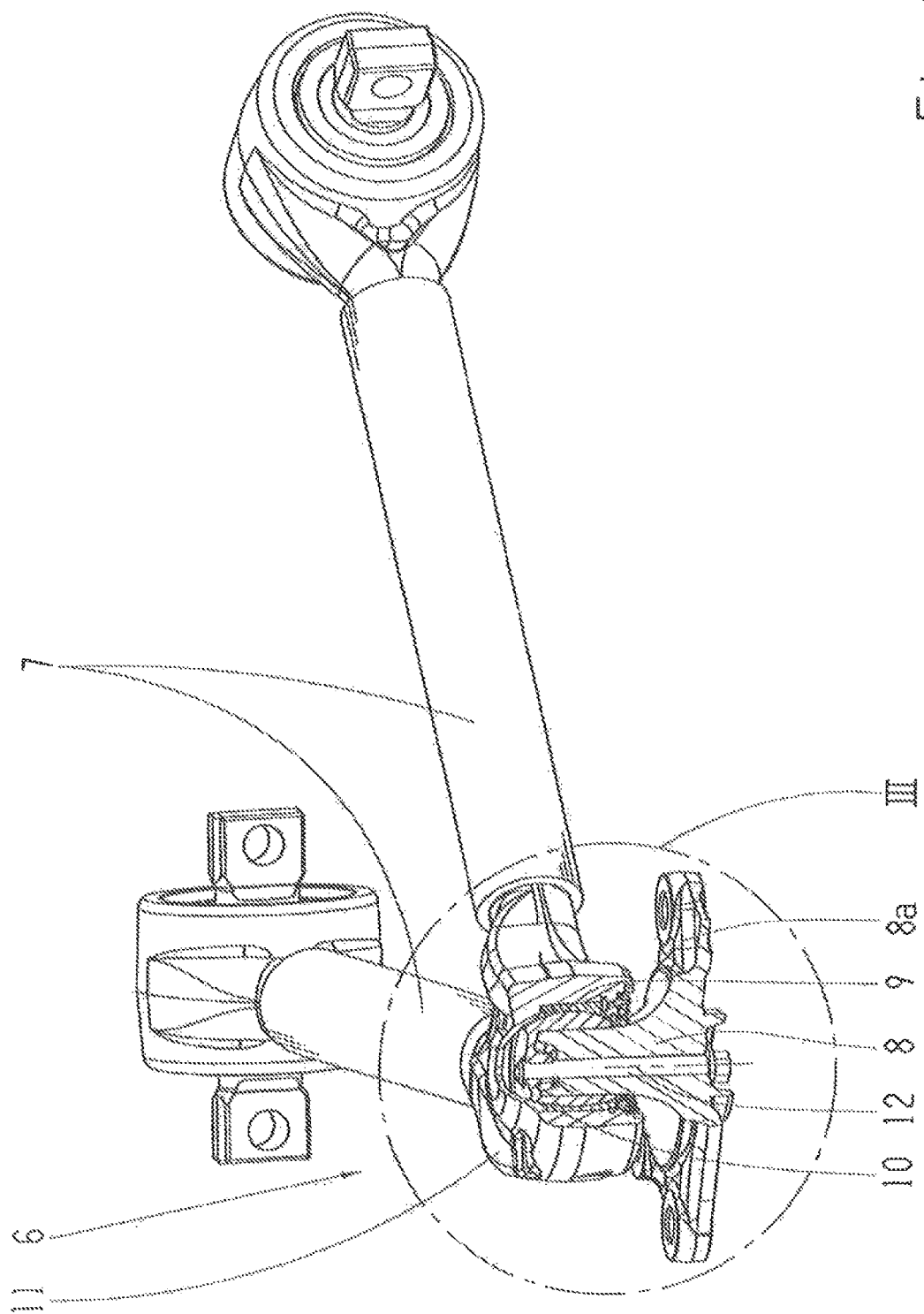
FIG. 2: A detailed perspective view, obliquely from above, of a joint device in the form of a wishbone with a central housing, which engages over a pin projecting from a flange plate.
Figure 3:
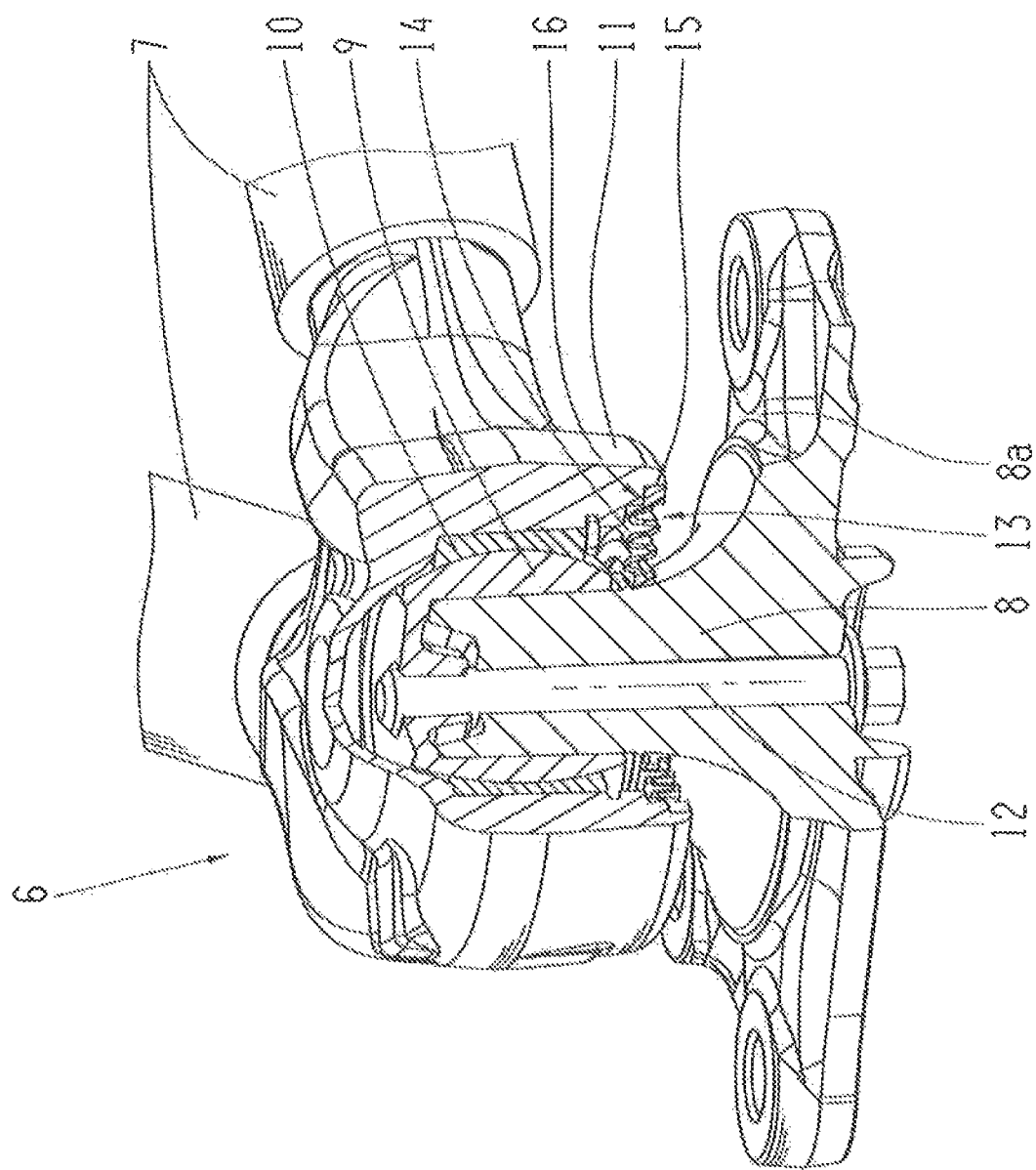
FIG. 3: A sectioned view of the joint device, approximately corresponding to the detail III in FIG. 2, FIG. 4: A view similar to that of FIG. 3 but seen in perspective from slightly underneath.
Figure 4:
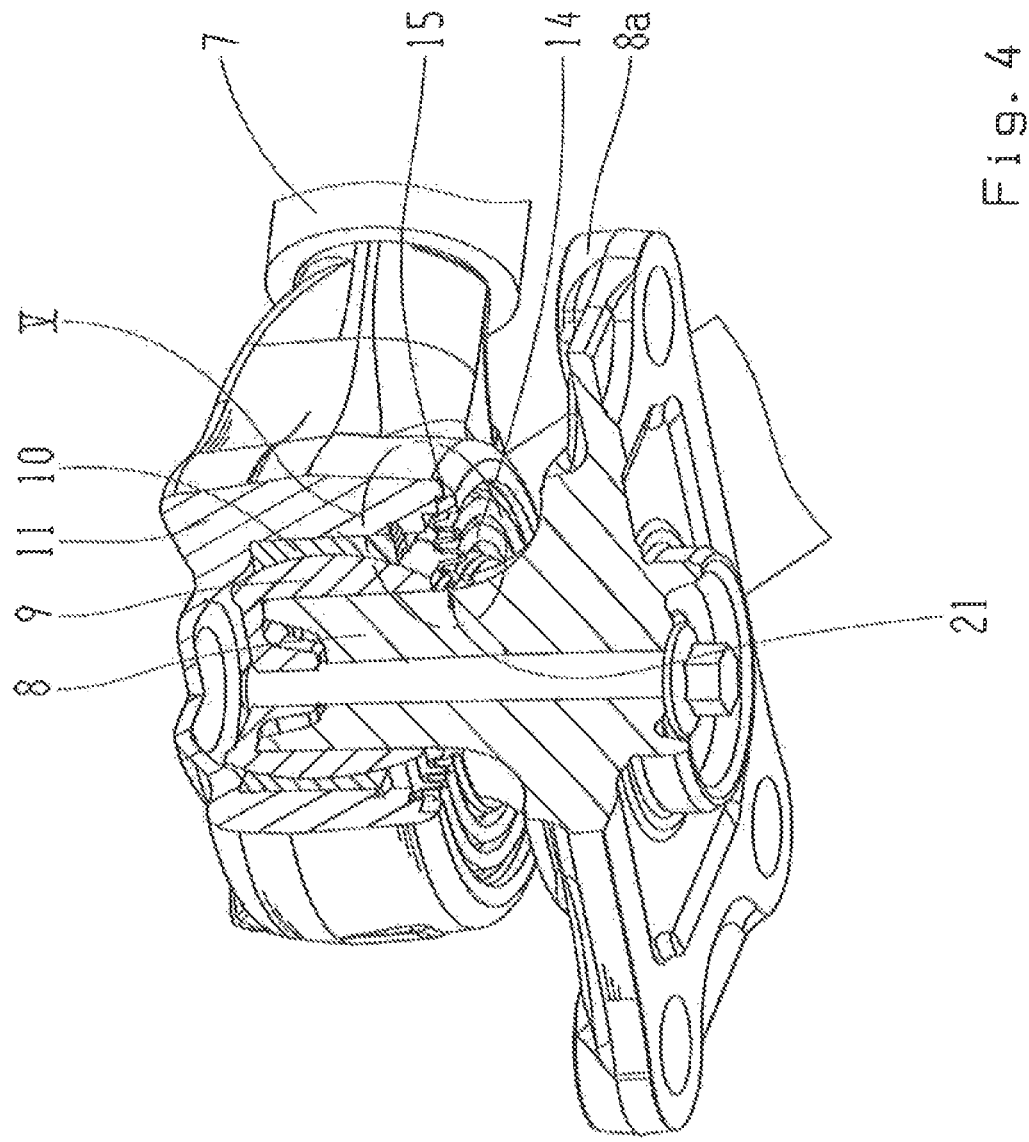

The motor vehicle represented only schematically in FIG. 1 is in this case a utility vehicle (UV) and has a vehicle chassis 2. Typically, such a chassis 2 can comprise two longitudinal side members 3 and a number of transverse members 4, and as a whole can be configured in various ways. At least one axle 5, for example a rear axle, is held on the chassis 2.

For example, a building-site vehicle or an off-road vehicle can also be made according to the invention.

The motor vehicle 1 shown is provided with at least one joint device 6; it could also have several joint devices of the type described in more detail below. The joint device 6 shown here serves to guide an axle 5 of the motor vehicle 1. For this, one or more (in this case two) links 7 running directly or indirectly from one or more chassis components 3, 4 to the joint device 6 are provided. An X-shaped link arrangement with a four-point connection is often used here. Further components connected to the chassis can also be connected by means of joint devices according to the invention.

The joint device 6 itself, in this case, comprises an axially extending joint pin 8, with a substantially ball-shaped wider portion 9. This can be formed integrally on the joint pin 8 or it can form a separate component and relative to a receiving joint socket 10 it can move by pivoting and tilting in the manner of a ball joint. The joint socket 10 is gripped firmly by an outer housing 11 of the joint device 6, so that the mobility of the joint socket 10 relative to the ball-shaped wider portion 9 at the same time allows relative mobility—here in a pivoting direction orientated laterally to the travel direction F and in a tilt direction lying in the travel direction F—between the housing 11 and the joint pin 8. A twisting about the axis 12 can also be possible between the housing 11 and the joint pin 8. Such joint devices 6 can also for example be provided in wheel joint or in front axle guides.

In this case, for example, the joint pin 8 widens downward to form a plate-shaped flange 8a, which for example is attached to a differential housing of a rear axle 5. The flange 8a can also be a separate assembly from the joint pin 8, or the pin 8 can comprise an entirely different connection to other components, and can also be fitted in a different position.

In this case the housing 11 radially surrounds the joint pin 8 completely; it can also surround the pin only partially. A gap, made necessary because of the relative mobility between the housing 11 and the pin 8, is closed by a sealing device 14 which is effective in any position of the components 8, 11 relative to one another. This sealing device 14 is in contact at least radially on the outside (17) with an inner wall area 15 of the housing, and is supported there. In addition, this outer edge of the sealing device 14 can also be in contact with a wall area 16 opposite the seal and likewise be supported axially by it.

The radially outer edge area 17 of the sealing device 14 can be acted upon by an element 18 that pre-stresses it outward, For this, a clamping ring 18 located within or outside the sealing material of the sealing device 14 can be considered. FIG. 7 shows as an example such a clamping ring 18 vulcanized into the material of the seal 14. Besides the stressing, it can for example also be possible to bond the seal 14 to the surfaces 15 and 16.

To form the contact surfaces 15, 16 for the sealing device 14, in this case for example a notch is provided on the axially lower end of the housing; a radially inward-extending groove in the housing 11 would also be possible as an alternative. In the example shown here, the contact surface 15 on the housing 11 has an axial length 19 of at least 8 millimeters. Depending on the size of the joint, this axial length 19 can also be several centimeters. In any case the seal 14 is almost completely enclosed against the contact surface, so that axially it does not project—as shown here—or only with a fraction of its length, and is therefore well protected and supported.

In the example embodiment shown, not only the radially outer edge 17 of the seal 14 surrounded by the housing 11, but also, the sealing device 14 is held entirely in a protected position screened on the outside by the housing 11, In this case the sealing device 14, along its axial extension axially relative to the pin 8, is positioned completely within the contour of the housing 11 and it therefore does not project beyond the housing into a free area. This results in particularly effective protection for example against sand and stones, which could be thrown up onto the pin 8 with some force in a direction opposite to the travel direction F, or against a high-pressure cleaner directed horizontally and radially inward onto the pin 8.

In this case, as shown, the sealing device 14 with its edge areas radially on the inside (20) and radially on the outside 17, can be positioned axially at the same level relative to the pin 8.

At its radially inner edge area 20, for example, the sealing device 14 is held in position behind an edge 21 formed on the pin 8, as can be seen clearly in FIG. 7. This edge 21 can have an almost saw-tooth shape, so that a seal 14 once engaged under the edge 21 cannot move back again. On the other hand, however, the seal 14 with its edge area 20 cannot slip any farther downward, since the pin 8 widens in that direction, Here too, bonding and/or a further clamping ring 22 can be provided in addition or alternatively. instead of the spur-shaped, surrounding edge 21, a separate holding ring 23 can be provided, for example as indicated in FIG. 5, which clamps the seal axially downward toward the widening part of the pin 8.

On the whole, for large loads it is advantageous if the sealing device, with its radially inner 20 and radially outer 17 edge areas, is secured in position on the pin 8 or on the housing 11 at least with interlock. A friction-force attachment, for example by bonding, can then be provided in addition. Below the outer end 17, for example, a retaining ring (not shown here) can also be provided for axial security.

As can be seen in the figures, the sealing device 14 extends between its radially inner edge area 20 and its radially outer edge area 17 in a meandering shape with sections directed upward and downward, so that part of the elasticity of the seal is imparted by its geometry. In addition, the sealing device 14 is at least substantially made from a rubber-elastic material, whose hardness can vary. The seal can also be injection-molded as a 2K material, so that the edge areas 17, 20 have higher rigidity that the area radially between them, which can then undergo elastic deformation quite easily.

INDEXES

1 Motor vehicle
2 Vehicle chassis

3 Longitudinal member
4 Transverse member
5 Vehicle axle
6 Joint device
7 Link
8 Joint pin
8a Flange
9 Ball-shaped wider portion
10 Joint socket
11 Housing
12 Joint axis
13 Gap
14 Sealing device
15 Radial wall area
16 Axial wall area
176 Outer edge area
18 Clamping ring
19 Axial length
20 Radially inner area
21 Edge on the pin
22 Separate securing ring
23 Separate holding ring

The invention claimed is:

1. A joint device comprising:
an axially extending joint pin,
a housing surrounding the joint pin radially either wholly or partially,
the joint pin and the housing being movable relative to one another at least by either pivoting or rotating,
a gap between the joint pin and the housing being closed by a sealing device which closes the gap in any position of the joint pin and the housing relative to one another,
the sealing device having first and second axial sides and a radially outer edge area radially on an outside thereof, and when the sealing device is located in an installed position the outer edge area being in contact with and being supported by an inner wall area of the housing and, at a radially inner edge area of the sealing device, the inner edge area of the sealing device, when the sealing device is located in the installed position, being secured in one axial direction by either a radially projecting edge of the joint pin or by a separate holding ring located on the first axial side of the inner edge area of the sealing device, and in the installed position of the sealing device, an entirety of the sealing device is axially located within the housing,
the sealing device extends radially between the inner and the outer edge areas, and the sealing device extends axially from a lowermost axial level thereof located axially between the first and the second axial sides of the inner and the outer edge areas to an uppermost axial level thereof located axially beyond the first axial side of the inner and the outer edge areas, and
an exterior surface of the joint pin widens radially outward to form a plate-shaped flange located on the second axial side of the inner edge area of the sealing device so that the inner edge area of the sealing device cannot slip in the other axial direction.

2. The joint device according to claim 1, wherein a radially outermost portion of the sealing device has a ring element in the outer edge area, and the ring element of the radially outermost portion of the sealing device pre-stresses the outer edge area of the sealing device outward.

3. The joint device according to claim 2, wherein the ring element that pre-stresses the outer edge area of the sealing device is a clamping ring located either within or externally of seal material of the sealing device.

4. The joint device according to claim 1, wherein either a notch or a radially inward-extending groove provided in the housing forms a first contact surface for the sealing device, and the notch or the groove in the housing forms a second contact surface for the sealing device which extends radially, the second contact surface of the housing being radially aligned with the radially projecting edge of the joint pin or the holding ring such that the first axial sides of the inner and the outer edge areas of the sealing device are at a same axial level relative to the pin.

5. The joint device according to claim 1, wherein a radially outermost edge area of the sealing device abuts against the inner wall area of the housing, and the inner wall area of the housing has an axial length of at least 8 millimeters.

6. The joint device according to claim 1, wherein the sealing device in the installed position is screened by the housing radially from the outside thereof.

7. The joint device according to claim 6, wherein the sealing device is located completely radially between the housing and the pin and within an axial extent of the housing.

8. The joint device according to claim 1, wherein the plate-shaped flange is attached to a differential housing of a rear axle of a motor vehicle.

9. The joint device according to claim 1, wherein in the installed position of the sealing device, the first axial side of the radially inner edge area and the first axial side of the radially outer edge area of the sealing device are located axially at a same level relative to the joint pin, and the second axial side of the radially inner edge area and the second axial side of the radially outer edge area of the sealing device are located axially at a same level relative to the joint pin.

10. The joint device according to claim 1, wherein the sealing device is axially secured in position by the radially inner edge area and the radially outer edge area of the sealing device which directly contact the exterior surface of the joint pin and the inner wall area of the housing, respectively, at least with interlock.

11. The joint device according to claim 1, wherein the sealing device extends in a meandering shape, between the radially inner edge area and the radially outer edge area of the sealing device, with axially upward and axially downward sections, the axially upward and the axially downward sections all being axially located above the second axial sides of the inner and the outer edge areas of the sealing device.

12. The joint device according to claim 1, wherein the sealing device is made at least substantially from a rubber-elastic material.

13. A joint device in combination with a motor vehicle, the joint device comprising:
an axially extending joint pin,
a housing surrounding the joint pin radially either wholly or partially,
the joint pin and the housing being movable relative to one another at least by either pivoting or rotating,
a gap between the joint pin and the housing being closed by a sealing device which closes the gap in any position of the joint pin and the housing relative to one another,
the sealing device having first and second axial sides and a radially outer edge area radially on an outside thereof, and when the sealing device is located in an installed position the outer edge area is in contact with and supported by an inner wall area of the housing and, at a radially inner edge area of the sealing device, the inner edge area of the sealing device, when the sealing device is located in the installed position, being prevented from axially moving relative to the joint pin in a first axial direction by either a radially projecting edge of the joint pin or by a separate holding ring, the first axial side of the inner edge area of the sealing device facing the projecting edge of the joint pin or the holding ring, and in the installed position of the sealing device, an entirety of the sealing device is axially located within the housing, the sealing device extends radially from the inner edge area to the outer edge area, and the sealing device extends axially such that sections of the sealing device are arranged in the first axial direction beyond axial levels of the first axial sides of the inner and the outer edge areas, and the second axial sides of the inner and the outer edge areas of the sealing device forming an axial extent of the sealing device in a second axial direction, and an exterior surface of the joint pin continuously widens radially outward from the projecting edge of the joint pin or the holding ring to form a plate-shaped flange so that the inner edge area of the sealing device is prevented from axial movement in a second axial direction toward the plate-shaped flange.

14. The joint device in combination with the motor vehicle according to claim 13, wherein the motor vehicle is a utility vehicle (UV) and the joint device guides an axle of the motor vehicle by at least one link running either directly or indirectly from the joint device to at least one chassis component.

15. A joint device comprising:
a joint pin defining an axis,
a housing radially surrounding the joint pin,
the joint pin being received within the housing such that the joint pin and the housing being at least one of pivotable and rotatable relative to each other,
a gap being formed between the joint pin and the housing and being enclosed by a sealing device,
the sealing device forming a seal between the joint pin and the housing,
an outer end of the sealing device having a radially outermost surface being in contact with and supported by an inner surface of the housing when the sealing device is located in an installed position, and an inner end of the sealing device having a radially innermost surface abutting an exterior surface of the joint pin when the sealing device is located in the installed position, the inner end of the sealing device being axially secured relative to the joint pin by a protruding edge of the joint pin located on a first axial side of the sealing device, the joint pin radially widening out to form a plate-shaped flange located on a second axial side of the sealing device such that the inner end of the sealing device is axially fixed relative to the joint pin by the protruding edge of the joint pin and the plate-shaped flange, and in the installed position of the sealing device, an entirety of the sealing device is axially located within the housing, the first axial side of the sealing device defining a first axial edge of the outermost surface of the sealing device and a first axial edge of the innermost surface of the sealing device, and radially between the innermost and the outermost surfaces of the sealing device, the sealing device has at least one section that extends in an axial direction away from the second axial side of the sealing device and beyond axial levels of the first axial edges of the outermost and the innermost surfaces of the sealing device, and the inner end of the sealing device having first and second radially extending faces that delimit the innermost surface of the sealing device, and the exterior surface of the joint pin having a radius that continuously increases along the axis from the first face of the inner end of the sealing device to the second face of the inner end of the sealing device, and the outer end of the sealing device having first and second radially extending faces that delimit the outermost surface of the sealing device, the first faces of the inner and the outer ends of the sealing device being radially aligned with each other, and the second faces of the inner and the outer ends of the sealing device being radially aligned with each other.

16. The joint device according to claim 15, wherein the exterior surface of the joint pin flares radially outward along the axis from the protruding edge of the joint pin to the plate-shaped flange, and the innermost surface of the sealing device flares radially outward along the axis and mates with the exterior surface of the joint pin to prevent axial movement of the inner end of the sealing device toward the plate-shaped flange.

17. The joint device according to claim 15, wherein the joint pin and the plate-shaped flange are a unitary component.

18. The joint device according to claim 15, wherein the protruding edge of the joint pin axially separates the inner end of the sealing device from a ball-shaped portion of the joint pin.

* * * * *